July 18, 1961 J. HICKS IV 2,992,447

MAGNETIC HEAD CLEANING TAPE

Filed April 9, 1957

John Hicks IV
INVENTOR.

BY Clarence A. O'Brien
and Harvey B. Jacobson
Attorneys

United States Patent Office 2,992,447
Patented July 18, 1961

2,992,447
MAGNETIC HEAD CLEANING TAPE

John Hicks IV, 6240 Coral Lake Drive, Miami Southwest, Fla.

Filed Apr. 9, 1957, Ser. No. 651,787
1 Claim. (Cl. 15—210)

This invention relates to a magnetic head cleaning tape adapted to clean the magnetic heads of any magnetic tape machine which is designed to magnetically record, play back, reproduce or project sounds or pictures.

The primary object of the present invention is to clean the magnetic heads of any magnetic tape machine of dust, oxides or other substances, left on the magnetic heads by magnetic tape during the process of magnetic recording, play back, reproduction or projection.

A further object of the invention resides in the provision of means for automatically cleaning the magnetic heads before the magnetic tape comes in contact with the magnetic heads and to automatically clean the magnetic heads after the magnetic tape has passed over the heads in the process of recording, play back, reproduction or projection.

Still further objects and features of this invention reside in the provision of a magnetic head cleaning tape which may be appended to conventional magnetic recording or reproduction tape or which may be formed as a separate structure in itself. It is to be understood that the term magnetic recording tape may be taken as any type of magnetic tape used for recording, playing back, reproducing or projecting sounds or pictures.

These, together with the various ancillary objects and features of the invention which will become apparent as the following description proceeds, are attained by this magnetic head cleaning tape, preferred embodiments of which have been illustrated in the accompanying drawings, by way of example only, wherein:

FIGURE 7 is a perspective view of a magnetic head having a recording head and a play back head and showing in phantom the cleaning of both of these heads by the tape as the tape passes by.

Figure 7:
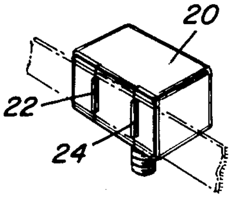
Figure 5:
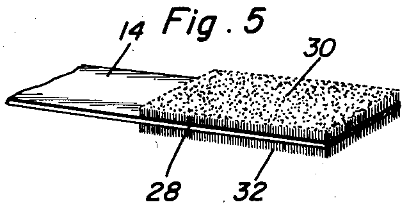
FIGURE 5 is a partial perspective view of a portion of a modified form of tape incorporating the present invention.
Figure 3:
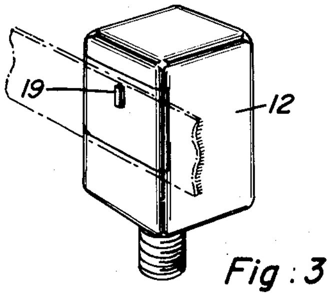
FIGURE 3 is a perspective view illustrating a portion of a tape passing by a magnetic head.
Figure 6:
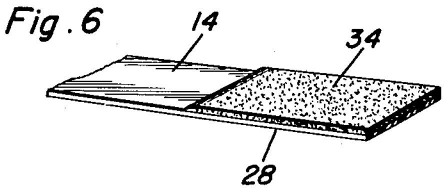
FIGURE 6 is a perspective view of a portion of a tape employing a coating of adhesive substance.

With continuing reference to the accompanying drawings wherein like reference numerals designate similar parts throughout the various views, reference numeral 10 generally designates a magnetic tape machine having a magnetic head 12 past which a magnetic tape 14 is adapted to be directed, the magnetic tape 14 engaging guide rollers as at 16 and 18. The magnetic head 12 may be of any suitable type such as shown in FIGURE 3 which includes a magnetic pick-up member 19 or may be of the type as indicated at 20 in FIGURE 7 including the recording head 22 and the play back head 24 or the like.

Figure 1:
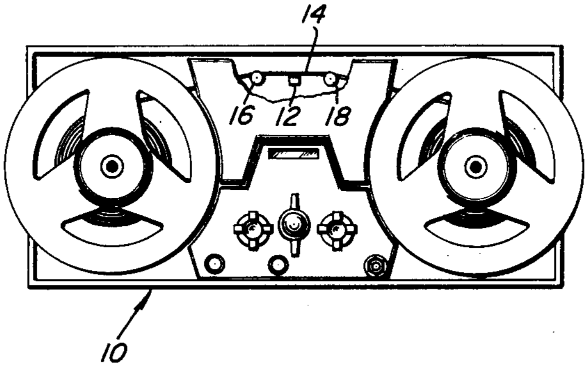
FIGURE 1 is a plan view of a magnetic tape machine illustrating the manner in which the tape passes by the magnetic head.
Figure 2:
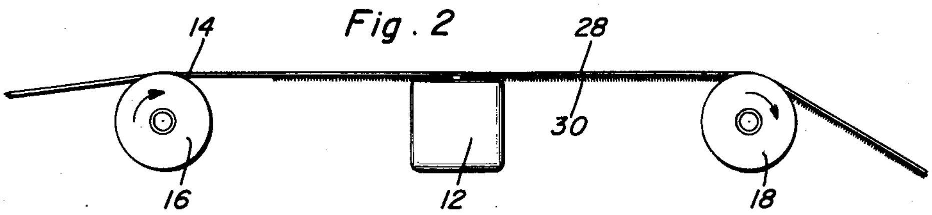
FIGURE 2 is an enlarged plan view illustrating the manner in which tape passes by a magnetic head and is guided by rollers.
Figure 4:
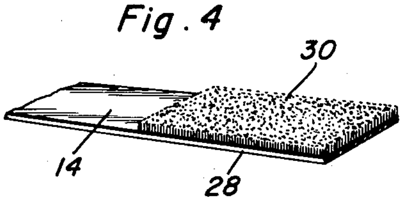
FIGURE 4 is a partial perspective view of a portion of a tape constructed in accordance with the invention.

The concept of the present invention resides in the provision of an automatic clean off tape which may be properly used as a lead-off section attached to a magnetic tape or an independent section for cleaning the magnetic heads of all magnetic tape machines. As shown in the figures, the invention is utilized in conjunction with a magnetic tape 14 and is provided with a lead-off section 28 of relatively strong material so that when the coating 30 of a suitable plastic or natural material which will permit the resultant surfacing to have a short stand-up fiber having a nap or brush-like quality such as is found in velour, passes by the pick-up head it will not cause tearing of the tape. The nap or brush-like surface may be produced in a manner such as is shown in Patents 2,389,657 and or 2,395,217 wherein the tape is provided with an adhesive coating and subsequently flock is deposited thereon to produce the desired surface. It is understood that the nap or brush-like surface could be produced by other means. In lieu of the single coating 30, a coating as at 32 may be formed on the other side of the tape 28 as shown in FIGURE 4. Further, in lieu of the coatings 30 and 32, there may be provided a coating of an adhesive material such as is adapted to pick up dust, oxides, or other particles which have been deposited on the magnetic heads as at 34.

The automatic cleaning tape when used either as a lead-off tape or as a separate cleaning tape may be used alone or in conjunction with a cleaning agent impregnated on the lead section of the automatic cleaning tapes either in the manufacture or by dipping prior to the cleaning operation.

The foregoing is considered as illustrative only of the principles of the invention. Further, since numerous modifications and changes will readily occur to those skilled in the art, it is not desired to limit the invention to the exact construction shown and described and accordingly, all suitable modifications and equivalents may be resorted to, falling within the scope of the invention as claimed.

What is claimed as new is as follows:

A cleaning tape especially adapted for use in connection with magnetic recording and reproducing apparatus, comprising an elongate flexible tape having leading and trailing end portions, said leading and trailing end portions having upper and lower faces, and brush means including a nap portion carried by both of said leading and trailing end portions on each of said upper and lower faces so as to travel through said recording and reproducing apparatus and pre-clean and post-clean the apparatus by a brushing action.

References Cited in the file of this patent

UNITED STATES PATENTS

| | | |
|---|---|---|
| 1,208,064 | Wilber | Dec. 12, 1916 |
| 1,234,852 | Avram | July 31, 1917 |
| 1,296,779 | Denio | Mar. 11, 1919 |
| 1,823,689 | Kelley | Sept. 15, 1931 |
| 2,606,409 | Gordon | Aug. 12, 1952 |
| 2,800,215 | Converse | July 23, 1957 |
| 2,819,186 | Franck | Jan. 7, 1958 |
| 2,886,841 | Wilcox | May 19, 1959 |